SLIDE FASTENERS

Original Filed Sept. 17, 1953 3 Sheets-Sheet 1

INVENTOR.
WILLIAM MIKULAS
BY James and Franklin
ATTORNEYS

SLIDE FASTENERS

Original Filed Sept. 17, 1953 3 Sheets-Sheet 2

INVENTOR.
WILLIAM MIKULAS
BY James and Franklin
ATTORNEYS

SLIDE FASTENERS

Original Filed Sept. 17, 1953 3 Sheets-Sheet 3

INVENTOR.
WILLIAM MIKULAS
BY James and Franklin
ATTORNYS

United States Patent Office

Re. 25,22
Reissued Aug. 14, 196

25,223
SLIDE FASTENERS

William Mikulas, Staten Island, N.Y., assignor to Conmar Products Corporation, Newark, N.J., a corporation of New Jersey Original No. 2,810,174, dated Oct. 22, 1957, Ser. No. 380,786, Sept. 17, 1953. Application for reissue July 18, 1958, Ser. No. 755,823
31 Claims. (Cl. 24—205.15)

Matter enclosed in heavy brackets [ ] appears in the original patent but forms no part of this reissue specification; matter printed in italics indicates the additions made by reissue.

This application is a continuation in part of my prior application Serial No. 271,459, filed February 14, 1952, which in turn was a continuation in part of my still earlier application Serial No. 218,930, filed April 3, 1951.

The invention relates to sliders for slide fasteners of the type having spaced, interlockable fastener elements, and more particularly to sliders constructed to prevent jamming of the fastener upon material which may become lodged within the slider.

There are times, frequently due to the improper application of a slide fastener to an article such as a dress, when the material of the dress becomes caught within the slider. Sometimes a portion of an adjacent undergarment will enter the dress slider and cause the fastener to jam. This problem has received the attention of many workers in the art, and many solutions have been proposed.

It has been suggested to use sliders of the so-called "opening" or "removable" type. Sliders of this type are curative in concept, and have taken many different forms. Generally the snagged material may be released by temporary opening of the slider. Sliders constructed in this fashion have not been commercially successful. Making the parts of a small slider movable with respect to each other requires the utmost of precision effort. Sliders of even the ordinary type must be held to very close tolerances. The production problem is greatly increased when parts of the slider are hinged, or otherwise made movable. The cost of producing these so-called "removable" sliders is greatly out of proportion to the price that the item will fetch, for the entire slide fastener, of which the slider is but a component, must be sold at a very low price. Moreover, there is the difficult problem of educating the public to properly use such slider.

A second approach to meet the problem may be termed preventative. Sliders have been provided with guards or plows intended to push away and thereby prevent the entrance of extraneous material into the slider. Thus far, sliders of this type also have not been commercially successful. The plows or guards themselves sometimes coact with the fastener elements to snag material and jam the fastener. Moreover, such sliders are unduly bulky, and since the plows or guards extend beyond the slider proper, satisfactory closing of the fastener at its ends is prevented. Since the primary application of non-snagging sliders is for women's garments, the materials of which are comparatively sheer, bulky sliders and unsightly gaps are wholly unacceptable.

There are essentially two ways in which a slide fastener may become jammed or snagged. In one instance, which may be termed a "hem type" of jam, the garment portion or hem adjacent the garment's own fastener enters the side of the slider and works its way under a flange so that it becomes wedged within the slider channel between the slider wing and the fastener elements. In the other instance, which may be termed an "undergarment type" of jam, a portion of an undergarment in the path of movement of the slider of an outer garment enters the slider channel at the neck or diamond end of the slider and works its way around several fastener elements so th it becomes wedged between the fastener elements, a wi and the neck portion of the slider. In either case, t slider usually captures the extraneous or foreign mater so gradually that the user is unaware of the impendi jam until it is too late; the extraneous material becom jammed within the slider channel to such an extent th the slider cannot be moved in either direction withc damaging the material.

The present invention is based upon two wholly n concepts. For a hem type of jam, the slider is constru ed to automatically convey out from within the slider t material which may tend to find its way into the sli channel. No special manipulative effort is required to lease the extraneous material. The movement of the sl er is simply continued, and the user is usually unaw that a potential jam has been cured at the threshc The slider is constructed to automatically overcome a cure the resistance to movement which normally occ when foreign material enters the channel. In effect, slider is made to be self curative of a potential jam.

For an undergarment type of jam, the slider is c structed to prevent extraneous or foreign material fr gradually working its way so far into the slider chan that it becomes practically impossible to move the sli without damaging the garment or extraneous mater Foreign material must not be allowed to enter the st portion of the channel, or that area within the char where the fastener elements are meshed. The slide constructed to effectively block the passage of extrane material into the slider channel in such a fashion that user immediately becomes away of the presence of fending material. The movement of the slider is abru halted by sharp resistance encountered to its moven before the foreign material can work its way into slider channel to any appreciable degree. The use immediately and unmistakably put on notice that ther a piece of undergarment material in the way, and that slider must be moved in the opposite direction. A backing the slider off, the user, then aware of the p ence of foreign material in the path of the slider, cl the path so that the fastener may be opened or cl freely. In effect, the slider is made to prevent a jan this type, and to prevent injury of the undergarment terial, by definitely signalling the user that there is an struction present.

My improved slider is simple in construction, inex sive and rugged. No special manipulative effort is quired to release the foreign material, and the user not need special instructions in the use of a fastener ing such a slider. Auxiliary elements, such as plows, their attendant disadvantages are eliminated. The s is conventional in outward appearance and in manua eration. Nevertheless, it is constructed to automati overcome and cure the resistance to movement w normally occurs when foreign material enters the c nel from the side, or in the alternative to abruptly hal movement of the silder before any damage can be to material which would otherwise work its way c into the slider channel from either the post or mouth To accomplish the foregoing objects, and such objects as may hereinafter appear, my invention re to a non-jamming slide fastener, and more partic the slider component, as described in the following cification, taken together with the accompanying ings in which:

Figure 4:
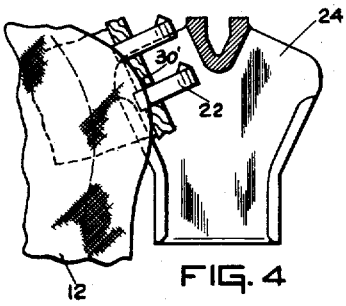
Figure 7:
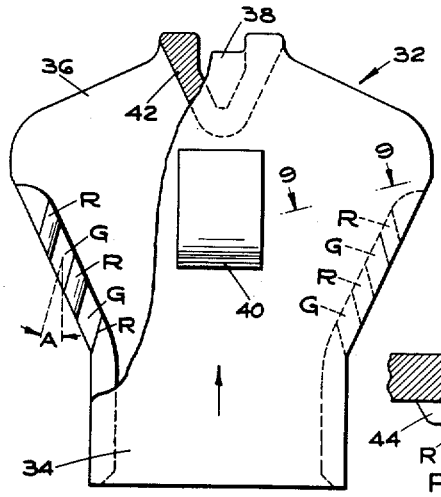
Figure 9:
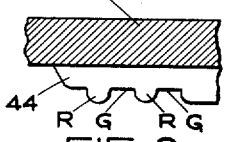
Figure 8:
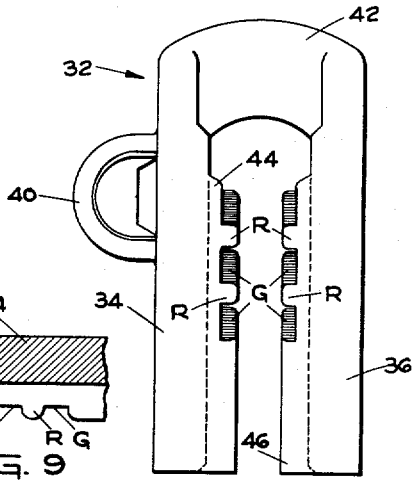
Figure 10:
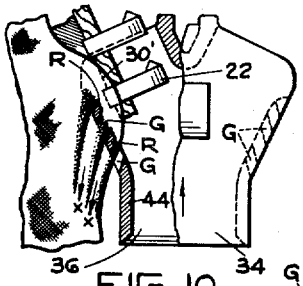
Figure 12:
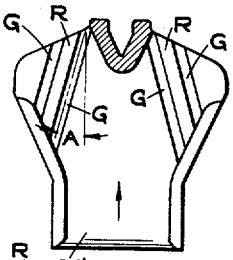
Figure 13:
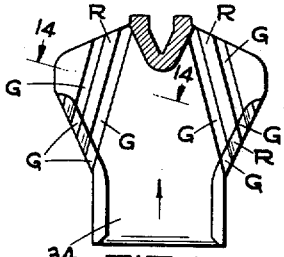
Figure 16:
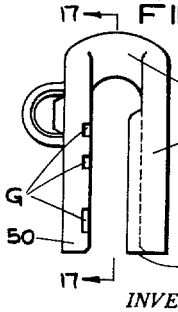

FIGS. 4. 5 and 6 are partial plan views, with the top ig of the slider omitted for clarity in illustration, wing the manner in which extraneous material may er a slider and be progressively wedged therein upon vard movement of slider;

FIG. 7 is a plan view, partly in section, showing one m of slider made in accordance with the present inven-, the pull tab being omitted since it forms no part he invention;

FIG. 8 is a side elevation of the slider shown in FIG. 7;

FIG. 9 is a section taken approximately in the plane of 9—9 of FIG. 7;

FIG. 10 is a plan view, partly in section, illustrating the slider shown in FIG. 7 acts to guide foreign mate- out of the slider channel, thereby preventing the fas- r from jamming;

IG. 11 is an enlarged fragmentary view, partly in sec-, showing how extraneous material is conveyed back of the slider;

IG. 12 shows the inside of a wing of a slider made in rdance with another form of the invention;

IG. 13 is a view similar to FIG. 12, of a slider wing bining the features previously shown;

IG. 14 is a transverse section taken approximately in plane of line 14—14 of FIG. 13;

IG. 15 is a view similar to FIG. 12, illustrating a still ner modification of the invention;

IG. 16 is a side elevation of still another form of the ntion, in which the slider has only two flanges;

IG. 17 is a section taken approximately in the plane ne line 17—17 of FIG. 16;

IG. 18 is a plan view, partly in section, showing an- r and preferred form of the invention;

G. 19 is a side elevation of the slider shown in FIG.

Figure 1:
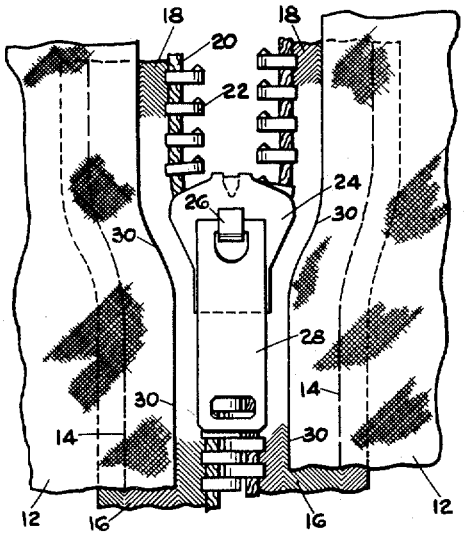
FIG. 1 is a partial plan view of a garment such dress, having a slide fastener sewn therein in accor with one of the acceptable procedures.
Figure 2:
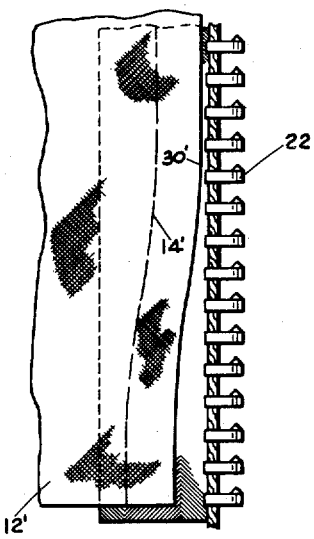
FIG. 2 is a partial plan view illustrating one of th proper but not uncommon ways of applying a slid tener stringer to a garment.
Figure 18:
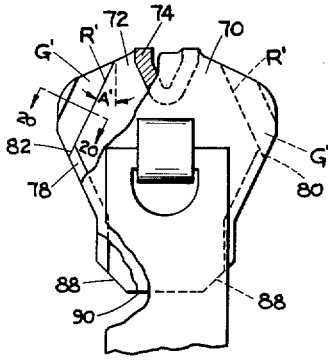

G. 20 is a section taken approximately in the plane ne 20—20 of FIG. 18;

G. 21 is a plan view, partly in section, illustrating this form of slider acts to automatically guide for- material or a hem out of the slider channel, thereby enting the fastener from jamming;

G. 22 is also a plan view, partly in section, illustrat- how this form of slider acts upon a portion of an rgarment which may tend to enter the slider channel ulting the movement of the slider before the fastener nes jammed; and GS. 23, 24 and 25 schematically illustrate the man- which the slider functions to prevent an undergar- type of jam or snag from occurring, and how the is freed from the foreign material.

ferring to the drawings, particularly FIG. 1, a slide ner of the conventional type is sewn to portions 12 garment, such as a dress, by lines of stitching 14. lide fastener comprises the usual pair of stringers 16, consisting of a taper 18 having a beaded or raised 20 along which are provided a series of spaced, inter- ble fastener elements 22. The slide fastener ele- are engaged and disengaged by the up and down nent of a slider 24. One wing of the slider is pro- with a lug 26 to which a pull tab 28 is attached to ate movement of the slider. The slide fastener has sewn to the material of the garment in accordance cceptable practice, the edges 30 being spaced from stener elements 22 a sufficient distance not to inter- ith the movement of the slider 26 along the fastener its.

shown in FIG. 2, a sewing machine operator some- s not sufficiently careful in sewing the slide fastener e garment, with the result that the edge 30' is lo- oo close to the fastener elements 22. In such case, ssibility of garment material becoming caught and d in the slider is greatly increased.

Figure 3:
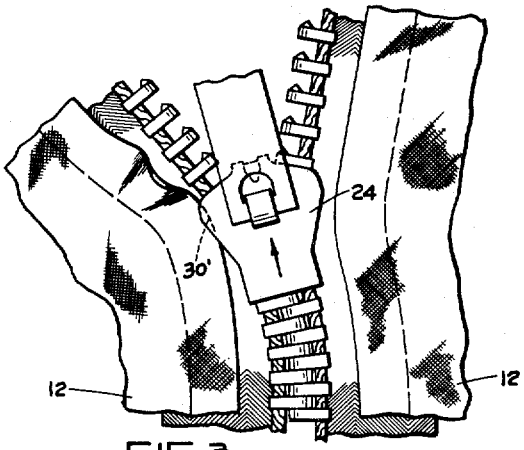
FIG. 3 is a view similar to FIG. 1, illustrating how even h a properly applied fastener, the slider may snag the terial of the garment.

FIG. 3 illustrates how even though the slide fastener may be properly sewn to a garment, as shown in FIG. 1, the fastener may become jammed. When a sideward twist is imparted to the slider as it is moved in fastener-closing direction, the edge of the garment material may become caught under a wing of the slider. When this occurs, or when as shown in FIG. 2, the fastener has been improperly applied, material may become caught between the slider and a fastener element, as shown in FIG. 4. Material may become snagged with the slider moving in fastener-opening direction, but snagging occurs most frequently when the slider is moved in fastener-closing direction, as shown in FIGS. 3 to 6. The divergence of the arm portions of the Y-shaped slider encourages the entry of extraneous material.

Figure 5:
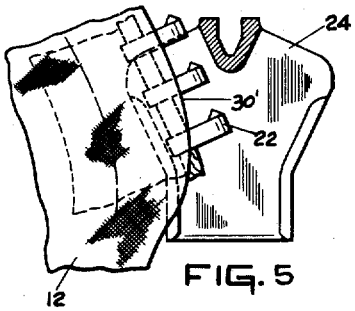
Figure 6:
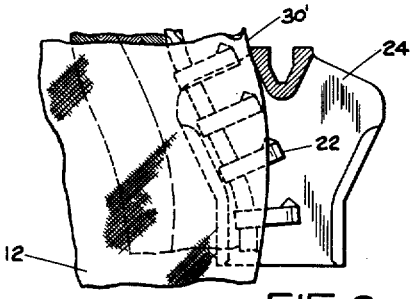

When material is first caught in the slider the operator is usually unaware of the occurrence, and continues to move the slider in the desired or closing direction. Other fastener elements move into the slider, channel, and more extraneous material is drawn into the slider, as shown in FIG. 5. The surfaces of the added fastener elements in the slider channel add their wedging action to the extraneous material. As the extraneous material is drawn into the slider, it is moved over toward the center of the slider. Finally, as shown in FIG. 6, a huge mass of material is drawn into the slider, and stops further movement. The extraneous material has been drawn toward the center of the slider until it bears against the "diamond" or neck portion, or until it is located in the zone where the working ends of the fastener elements are intended to overlap and come into mesh with each other. In fact, the offending material has also been drawn over those fastener elements which have not yet entered but are about to enter the slider, and thus the fastener is completely jammed. At this point, an attempt is usually made to move the slider in the opposite or fastener-opening direction. However, the fastener may be jammed so tightly that the fabric of the garment is torn in the effort, and often the slider cannot be moved back at all.

Referring now to FIGS. 7 to 10, a slider using some features of the present invention comprises a slider body 32 having a front wing 34 and a rear wing 36 spacedly connected at one end, as at 38. The front wing 34 is provided with a lug 40 to which a pull tab (not shown) is attached. The connected ends 38 of the wings define the neck or so-called "diamond" 42 of the slider. The wings 34 and 36 are formed with the usual inturned side flanges 44 and 46, respectively. The inner surfaces of the wings and their inturned side flanges together with the neck or "diamond" define a substantially Y-shaped channel for engaging and disengaging the fastener elements of the stringers. As so far described, the slider is of conventional construction, and may be of the non-lock, pin-lock, wing-lock, cam-lock or automatic-lock type.

In accordance with one main feature of the present invention, the slider is provided with escape passages to afford escape of extraneous material. These passages are preferably designed for automatically guiding or conveying such extraneous material away from the central longitudinal zone of the slider. More specifically, provision is also made for guiding or conveying the extraneous material completely out of the slider where it will no longer interfere with the movement of the slider.

In all forms of the invention shown in FIGS. 7 to 25, a part of the slider defining the internal slider channel is provided with guide means in the form of a groove or grooves G. The grooves, which have adjacent walls or ribs R, act to guide extraneous material outwardly, or, as preferred, out of the slider channel entirely. When a piece of fabric material finds its way into the slider channel, portions thereof are forced into the grooves G and and against its side walls or ribs R. Upon continued movement of the slider, the fabric material will follow the path of the grooves, and along the miniature rails R. The grooves are angularly disposed so that they diverge outwardly in a direction opposite to the direction of slider movement.

In this manner, the extraneous material is led away from the area where it will cause the fastener to jam. Preferably, the offending material is conveyed to the outside of the slider. The obstruction to movement of the slider is thus automatically overcome at the threshold. Continued movement cures the potential jam, instead of aggravating it. Any suitable diverging angle, indicated at "A" in FIG. 7, between the longitudinal axis of the groove and the longitudinal axis of the slider, may be selected. It will be noted that the grooves are at an acute angle (less than 90°) to the flanges. Indeed, with grooves in the divergent flanges alone, they might be parallel to the slider axis, that is, even more acute to the flanges than shown, and yet afford escape of material. It has been found, however, that in the sliders of FIGS. 7–17 a diverging angle at "A" of approximately 15° gives highly satisfactory results.

Referring now to the specific embodiment of the invention illustrated in FIGS. 7 to 11, the slider flange is provided with escape passages or anti-jamming means to cure jamming which occurs when the slider is moved in fastener-closing direction. This kind of jamming is by far the most common. A single groove may be used, or a plurality of spaced, substantially parallel grooves G in each flange. While benefit is obtained with less than a full set of guide means (that is, in both top and bottom wings and on both sides), a full set prevents jamming on top, bottom, right and left sides of the slider, to take care of any eventuality. The grooves extend all the way through the flanges, and are defined by adjacent walls or ribs R along their lengths.

Figure 11:
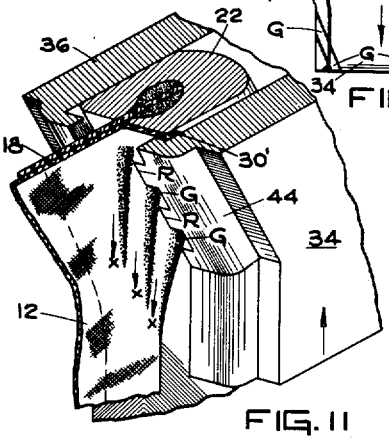

As shown in FIGS. 10 and 11, when a piece of undesirable fabric material 30' enters the slider channel and becomes wedged between the top wing 34 with its inturned flange 44, and a fastener element or fastener elements 22, portions of the material are forced into the grooves G and sidewardly against the ribs R. Continued movement of the slider in closing direction causes the fabric to be tracked outwardly from within the slider channel in the direction of the arrows X. Thus, the movement of the slider itself acts to automatically guide the extraneous material out from within the slider.

Referring now to FIGS. 8, 9 and 10, the escape passages or grooves have a dimension too small to catch and lock, or to permit escape of, the interlockable elements. More specifically, in FIGS. 8 and 9 it will be seen that the grooves have a height substantially less than the height of the flanges in which they are formed. Moreover, as is best shown in FIG. 10, the grooves have a width less than the thickness of the interlockable elements. Either precaution would alone prevent the elements from locking in or escaping through the grooves, and both precautions together result in a slider action which is just as smooth as though the escape passages or guide grooves had not been provided at all. These narrow passages are nevertheless adequate to guide the fabric out of the slider.

Another form of the invention is illustrated in FIG. 12. Instead of forming grooves and ribs in the flange portions of the slider, the grooves are formed in the flat portions which define the channel within the flanges. Only the top wing 34' is shown in this figure. While a slider thus made will not necessarily guide the extraneous material completely out from within the slider channel, the grooves will act to guide the material outwardly away from the central longitudinal area of the channel, at or beneath the "diamond," where the material otherwise would be certain to jam the fastener. With this form of the invention, the user is usually able to work the slider free of the material lodged in the slider, before the fastener is really jammed.

Figure 14:
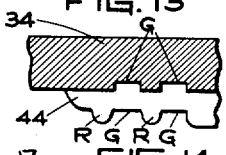

In the form of the invention shown in FIGS. 13 and 14, the guide grooves are formed in both the flat inner surfaces of the wing and in the flange portions. In this form of the invention, very large tracking and guiding areas are provided, thereby increasing the power of the slider to automatically convey extraneous material out of the slider. In a sense, in this form of the invention the face grooves may be considered predominantly guide grooves, and the flange grooves may be considered predominantly escape grooves, and both are preferably though not necessarily arranged in alignment as shown.

Figure 15:
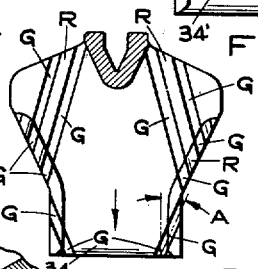

FIG. 15 illustrates additional anti-jamming means formed in the stem portion of the Y-shaped channel of the slider. The lowermost grooves G in this instance preferably are formed in both the flat and flange portions of the slider, in order to supply sufficient trackage or groove area for guiding extraneous material out from within the slider. While, as previously indicated, most instances of fastener-jamming occur when the slider is moved in fastener-closing direction, it is possible for extraneous material to become lodged within the slider channel when the slider is moved in the fastener-opening direction indicated by the arrow. The grooves therefore are arranged in a direction reverse to the groove direction for fastener-closing movement. In both cases the grooves diverge in a direction opposite to the direction of movement of the slider.

It will be understood, of course, that each of the sliders shown in FIG. 10, FIG. 12 or FIG. 13, may have its stem portion provided with the guide means shown in FIG. 15. This is suggested by the upper grooves shown in FIG. 15.

Figure 17:
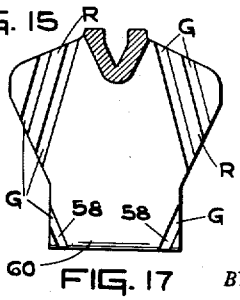

FIGS. 16 and 17 show still another form of my invention. It has been found that a slider having flanges on only one of the two wings works substantially as well as a slider having flanges on both wings. The slider of FIG. 16 comprises a front wing 50 and a rear wing 52 connected by a neck 54, but only one wing, preferably the rear wing 52, has side flanges 56. Snagging most frequently occurs at the top of the fastener because of the usual manner in which a fastener is sewn into a dress and it is therefore preferable to locate the flanges on the bottom wing, for the flanges encourage the entrance of extraneous material into the slider channel. By omitting the flanges on the top wing the likelihood of entrance of extraneous material is lessened.

Nevertheless such material may enter the slider channel and will snag, and in accordance with the principle of the present invention already outlined, I provide divergent grooves or escape passages to guide the extraneous material back out of the slider. By omitting the flange on the top wing an unobstructed path is provided for the extraneous material to be guided back out of the slider by the diverging grooves or escape passages. For this purpose the flat inner face of the flangeless front wing 50 is provided with a plurality of spaced, substantially parallel grooves G, and intermediate ribs R, which diverge downwardly, that is, in a direction opposite to the direction of fastener-closing movement of the slider. In addition, if desired, grooves 58 may also be formed in the stem portion 60, these diverging upwardly, and functioning when the slider is moved in fastener-opening direction. The upper grooves formed in the arm portions of the Y-shaped channel function when the slider is moved in fastener-closing direction.

It will be understood that, if desired, the invention may be applied even more completely to a slider having one flangeless wing by providing additional escape passages in the flanges or/and the adjacent flat surface of the flange wing. In terms of the drawing, the front wing 50 of FIGS. 16 and 17 may be used in combination with a rear wing like that shown in FIGS. 7–10 having grooves through the flanges, or with a rear wing like that shown in FIG. 12 having grooves in the flat face within the flanges, or with a rear wing like that shown in FIG. 13 having grooves in both the flanges and the flat surface, or with a rear wing like that shown in FIG. 15 in which there are grooves in the stem portion as well as the arm portions of the Y-shaped channel.

The slider constructions hereinbefore described have ›en found to effectively cure a potential jam of the side · hem type. The most preferred form of the invention .own in FIGS. 18 to 25 is additionally effective in pre-›nting a snag or jam of the undergarment type. The .der shown in these views comprises a front wing 70 ıd a rear wing 72 connected by a neck portion 74, e wings each being provided with a pair of inturned le flanges 76 and 78, respectively. At the top end of e slider and above the upper ends of the inturned .nges, a groove G′ is provided. One side of the groove ts as a wall, rib or abutment R′, which is adjacent to .d parallel to the groove. The grooves and abutments e preferably provided in each wing of the slider on ch side of the neck portion, or four sets of grooves and utments in all.

Figure 21:
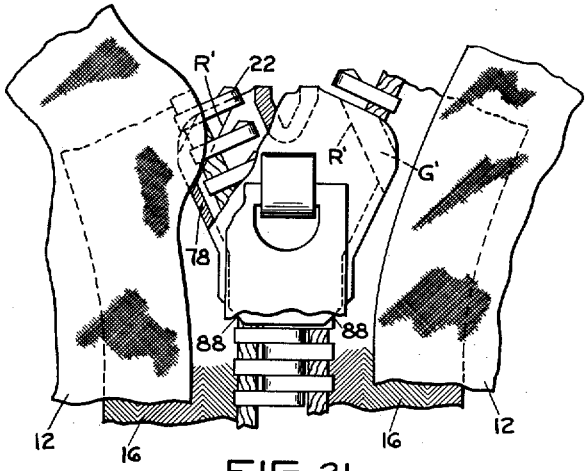
Figure 23:
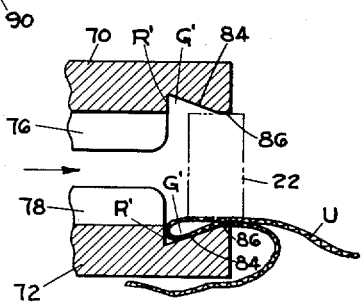
Figure 24:
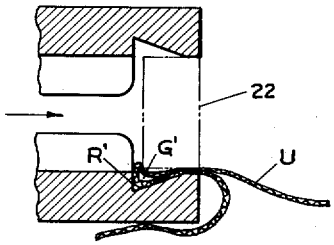

As shown in FIG. 21, the grooves and abutments G′, , serve the same purpose and function as the previously scribed grooves and ribs G, R, in automatically feeding traneous material such as a hem out from the side of ; slider. However, whereas the diverging angle of the ›viously described grooves and ribs is preferably 15°, s angle, designated A′, is now between 20 and 35°, d preferably 25°, for the now added function of pre-›nting an undergarment type of jam.

Figure 19:
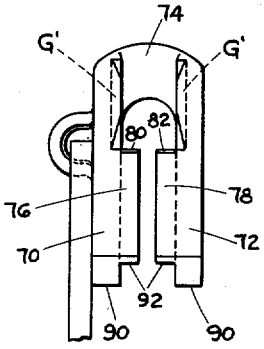

As shown in FIGS. 18 and 19, each groove G′ and its jacent abutment R′ extend from near the post portion down to the side of the slider with the abutment coin-lent or in line with the upper end of an inturned side ıge. The upper ends of the inturned side flanges 76, are designated 80, 82, respectively. The slider shown ssesses the usual dimensions so that to obtain the co-idence of the abutments R′ with the upper ends 80, of the inturned side flanges, these side flanges are ›rtened slightly. The amount that the side flanges are ›rtened is approximately equal to the width of a groove . While a slider of ordinary dimensions with slightly ›rtened inturned side flanges has been found satis-tory, it is within the purview of the invention to in-ase the overall length of the slider and thus retain original length of the inturned flanges. In any event, vill be observed that the grooves G′ and their adjacent ıtments R′ are located above the inturned flanges and the otherwise flat portions of the wings.

Figure 20:
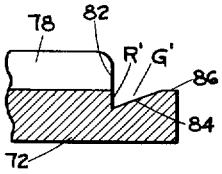
Figure 22:
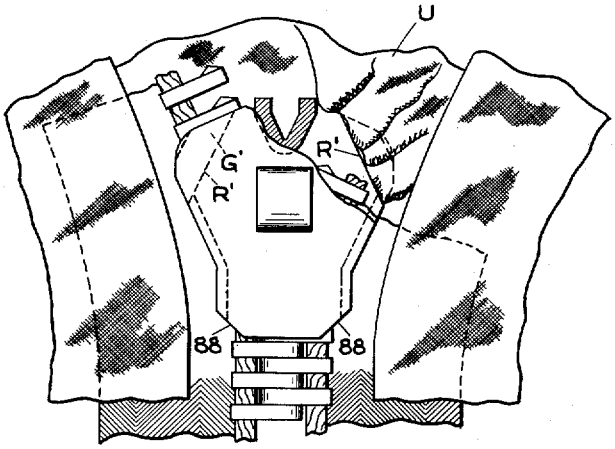
Figure 25:
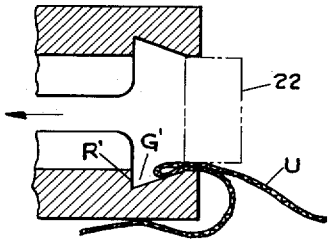

As shown in FIG. 20, the groove and abutment arrange-nt, G′, R′, is preferably made saw-toothed in cross-tion, there being a gradual slope 84 from a leading portion 86 of the wing to the base of the abutment R′. ; flat portion 86 is substantially in the same plane as inner surface of the wing so that there is no easy ess of foreign material into the slider channel. The ends 80, 82 of the inturned side flanges, for reasons ·ch will be subsequently explained, are each made stantially perpendicular to the slider wing rather than h the usual gently sloping bevel of ordinary sliders. ›se squared ends of the inturned side flanges are each ine with the substantially vertical abutment walls R′. When, as shown in FIG. 22, a portion of an under-ment, designated U, is located in the path of the slider ›n the slider is moved in fastener-closing direction, and ıld tend to enter the slider channel, the material con-lably and abruptly halts the movement of the slider ›re the slider can capture it to an extent where it omes practically impossible to extricate the material n the slider. As shown in greater detail in FIGS. 23 ·5, if the undergarment material does get beyond the portion 86, the material is forced into the groove G′, is halted by the abutment R′. The space between the portion 86 and the adjacent sides of the fastener ıents 22 is comparatively small so that the foreign erial does not easily enter the slider channel, but if oes get through this space, the groove G′ provides increased space which serves to relieve the pressure he slider upon the foreign material.

he diverging angle of the groove and abutment then act to guide or escort the material toward the flange end, which, because of its squared or vertical surface, supplements the blocking action of the groove and abutment. It has been found that the undergarment material actually piles up at the end of the flange and goes no further. When this occurs, the user immediately perceives that something is wrong, because the slider's movement is halted very abruptly. Ordinarily, undergarment material is sheer, and without the present invention, snakes into the slider so gradually, that before the user is aware of it, the slider cannot be moved in either direction. By means of the slider of the present invention, however, the offending material is gathered together or lumped in a manner which not only abruptly halts the movement of the slider, but permits the slider to be backed off very easily, as shown in FIG. 25. Now aware of the obstacle to slider movement, the user then pulls the outergarment outward away from the undergarment, or pushes the undergarment material out of the path of movement of the slider.

In the majority of cases, if snagging or jamming occurs, whether of the hem or undergarment type, it is upon the movement of the slider in the up or fastener-closing direction. For those few occasions which may occur when the slider is moved down or in fastener-opening direction, the narrow or mouth end of the slider may be provided with grooves at the corners of the mouth end of the slider, as shown in FIG. 15, except that each of the grooves is made to diverge at an angle of approximately 20 to 35° instead of approximately 15°, as there shown. For simplicity in manufacture, however, the slider is preferably made to overcome the two described types of jams by providing a diverging chamfer 88 of between approximately 20° to 45° at each of the four corners of the slider, as shown in FIGS. 18, 19, 21 and 22. In the drawing the chamfer is at 45°. The chamfers result in a slight shortening of the inturned flanges 76, 78 which would otherwise extend to the extreme lower ends of the slider 90. This small amount of flange shortening has been found not to interfere with the operation of the slider. The overall length of the slider may be lengthened to compensate for this, if desired. The inturned flanges themselves are also chamfered, and are formed so that their extreme edges 92 are each squared or at right angles to the inner surface of an adjacent wing. The chamfered edges act to guide hem material outwardly and away from within the slider, and the squared ends of the inturned side flanges serve to block any material which might tend to enter the mouth of the slider.

The described grooves and ribs may be formed in any suitable fashion. If the slider is made by stamping, the grooves may be formed by stamping in the same process of manufacture. If the slider is made by die casting, the grooves may be made in the die casting operation. If desired, a conventional slider may be subjected to an extra operation to cut or form the grooves.

It is believed that the construction and operation of the slider of my invention, as well as the advantages thereof, will be apparent from the foregoing detailed description. It will also be apparent that while I have shown and described my invention in several preferred forms, changes may be made in the structures disclosed without departing from the scope of the invention, as sought to be defined in the following claims.

I claim:

1. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, and a groove formed in an inturned side flange intermediate the ends to convey extraneous material entering the channel in a direction outwardly from the channel, said groove extending outwardly from one end in a direction opposite to the direction of movement of the slider on the stringers when said end is the leading end of the slider, and said groove being too small in dimension to lock or permit the escape of the interlockable elements.

2. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, and a plurality of spaced, substantially parallel grooves formed in the arm portions of the inturned side flanges to convey extraneous material entering the channel in a direction outwards from the channel, said grooves diverging from one end in a direction opposite to the fastener-closing direction of movement of the slider on the stringers when said end is the leading end of the slider.

3. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, and a plurality of spaced, substantially parallel grooves formed in the flat inner arm portions of a wing to convey extraneous material entering the channel in a direction outwardly relative to the channel, said grooves diverging from one end in a direction opposite to the direction of fastener-closing movement of the slider on the stringers when said end is the leading end of the slider.

4. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, a groove formed in an inturned side flange and an adjacent groove formed in a flat inner surface portion of a wing intermediate the ends to convey extraneous material entering the channel in a direction outwardly from the channel, said grooves extending outwardly from one end in a direction opposite to the direction of movement of the slider on the stringers when said end is the leading end of the slider.

5. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, a plurality of spaced, substantially parallel grooves formed in the arm portions of side flanges and adjacent grooves formed in the adjacent flat inner arm portions of the wing to convey extraneous material entering the channel in a direction ontwardly from the channel, said grooves diverging in a direction opposite to the fastener-closing direction of movement of the slider along the stringers.

6. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, a plurality of spaced, substantially parallel grooves formed in each of the arm portions of the inturned side flanges, grooves formed in the stem portions of the inturned side flanges, said grooves diverging in a direction opposite to the direction of the movement of the slider along the stringers and serving to convey extraneous material entering the channel in a direction outwardly from the channel in either direction of slider movement.

7. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, a plurality of spaced, substantially parallel grooves formed in the arm portions of inturned side flanges, adjacent grooves formed in the adjacent flat inner arm portions of the wings, grooves formed in the stem portions of inturned side flanges, and adjacent grooves formed in the adjacent flat inner stem portion of the wing, said grooves diverging in a direction opposite to the direction of movement of the slider along the stringers and serving to convey extraneous material entering the channel in a direction outwardly from the channel in either direction of slider movement.

8. A slider for slide fasteners of the type having two stringers with a series of spaced, interlockable elements, said slider comprising a front wing and a rear wing spacedly connected at one end, one wing having marginal flanges, and the other wing being flangeless, said parts providing a substantially Y-shaped internal channel, the inside face of the flangeless wing having a groove formed in each of the arm portions, said grooves diverging in a direction opposite to the direction of fastener-closing movement of the slider and serving to convey extraneous material entering beneath the flangeless wing in a direction outwardly from beneath the said wing.

9. A slider for slide fasteners of the type having two stringers with a series of spaced, interlockable elements, said slider comprising a front wing and a rear wing spacedly connected at one end, said rear wing having marginal flanges, and said front wing being flangeless, further comprising the inside face of the front wing having a groove formed in each of the arm portions, said grooves diverging in a direction opposite to the direction of fastener-closing movement of the slider and serving to convey extraneous material entering beneath the front wing in a direction outwardly from beneath the front wing.

10. A slider for slide fasteners of the type having two stringers with a series of spaced, interlockable elements, said slider comprising a front wing and a rear wing spacedly connected at one end, said rear wing having marginal flanges, and said front wing being flangeless further comprising the inside face of the front wing having a plurality of spaced, substantially parallel grooves formed in each of the arm portions, said grooves diverging in a direction opposite to the direction of fastener closing movement of the slider and serving to convey extraneous material entering beneath the front wing in a direction outwardly from beneath the front wing.

11. A slider for slide fasteners of the type having two stringers with a series of spaced, interlockage elements said slider comprising a front wing and a rear wing spacedly connected at one end, said rear wing having marginal flanges, and said front wing being flangeless further comprising the inside face of the front wing having a plurality of grooves formed in the stem portion, said grooves diverging in a direction opposite to the direction of fastener-opening movement of the slider and serving to convey extraneous material entering beneath the front wing in a direction outwardly from beneath the front wing.

12. A slider for slide fasteners of the type having two stringers with a series of spaced, interlockable elements said slider comprising a front wing and a rear wing spacedly connected at one end, said rear wing having marginal flanges, and said front wing being flangeless further comprising the inside face of the front wing having a plurality of spaced, substantially parallel grooves formed in each of the arm portions, grooves formed the stem portion, said grooves diverging in a direction opposite to the direction of movement of the slider and serving to convey extraneous material entering beneath the front wing in a direction outwardly from beneath the front wing in either direction of slider movement.

13. A slide fastener having two stringers with space interlockable elements, and a slider, said slider comprising a front wing and a rear wing spacedly connected their upper end, and further comprising inturned si flanges, said parts providing a substantially Y-shaped internal channel, said flanges intermediate their ends having escape grooves to afford release of extraneous material which may be accidentally caught in the slider during movement thereof, said escape grooves being disposed at an acute angle relative to the flanges in which they are formed, with the inner end of each groove nearer the upper end of the slider than the outer end of said groove, said escape grooves having a height less than the height of the flanges in which they are formed, and having a width less than the thickness of the interlockable elements, whereby said interlockable elements cannot lock in or escape through said grooves.

14. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing beyond the end of an inturned side flange, said groove diverging from one end in a direction opposite to the direction of movement of the slider on the stringers when said end is the leading end of the slider, one side of said groove acting as an abutment adjacent to and parallel to said groove, said groove and abutment acting to convey extraneous material tending to enter the channel from the side in a direction outwardly relative to the channel and to block the entry of extraneous material tending to enter the channel from the leading end of the slider.

15. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing beyond the end of an inturned side flange, the end of said flange being squared, said groove diverging from one end in a direction opposite to the direction of movement of the slider on the stringers when said end is the leading end of the slider, one side of said groove acting as an abutment adjacent to and parallel to said groove, said abutment being substantially coincident with the end of the inturned side flange, said groove and abutment acting to convey extraneous material tending to enter the channel from the side in a direction outwardly relative to the channel and to block the entry of extraneous material tending to enter the channel from the leading end of the slider.

16. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing above the upper end of an inturned side flange, the end of said flange being squared, said groove diverging from the neck end in a direction opposite to the direction of fastener-closing movement of the slider on the stringers when said neck end is the leading end of the slider, one side of said groove acting as an abutment adjacent to and parallel to said groove, said abutment being substantially coincident with the end of the inturned side flange, said groove and abutment acting to convey extraneous material tending to enter the channel from the side in a direction outwardly relative to the chanel and to block the entry of extraneous material tending to enter the channel from the neck end of the slider.

17. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing above the upper end of an inturned side flange, the end of said flange being squared, said groove diverging from the neck end in a direction opposite to the direction of fastener-closing movement of the slider on the stringers when said neck end is the leading end of the slider, one side of said groove acting as an abutment adjacent to and parallel to said groove, said abutment being substantially coincident with the end of the inturned side flange, said groove and abutment arrangement being saw-toothed in cross-section, there being a slope from a leading flat portion of the wing to the base of the abutment, said groove and abutment acting to convey extraneous material tending to enter the channel from the side in a direction outwardly relative to the channel and to block the entry of extraneous material tending to enter the channel from the neck end of the slider.

18. A slider for slide fasteners of the type having two stringers with a series of spaced, interlockable elements, said slider comprising a body having a front wing and a rear wing spacedly connected at one end by a neck portion, and further comprising a pair of opposed inturned side flanges on each of said wings, said parts providing a substantially Y-shaped internal channel, a groove formed in each wing above the upper end of each inturned side flange, the end of each of said flanges being squared, said grooves diverging from the neck end in a direction opposite to the direction of fastener-closing movement of the slider on the stringers when said neck end is the leading end of the slider, one side of each groove acting as an abutment adjacent to and parallel to said groove, said abutments each being substantially coincident with the end of said inturned side flange, said groove and abutment arrangement being saw-toothed in cross-section, there being a slope from a leading flat portion of the wing to the base of the abutment, said grooves and abutments acting to convey extraneous material tending to enter the channel from the side in a direction outwardly relative to the channel and to block the entry of extraneous material tending to enter the channel from the neck end of the slider.

19. A slider for slide fasteners of the type having two stringers with a series of spaced, interlockable elements, said slider comprising a body having a front wing and a rear wing spacedly connected at one end by a neck portion, and further comprising a pair of opposed inturned side flanges on each of said wings, said parts providing a substantially Y-shaped internal channel, a groove formed in each wing above the upper end of each inturned side flange, the end of each of said flanges being squared, said grooves diverging approximately 20 to 35 degrees from the neck end in a direction opposite to the direction of fastener-closing movement of the slider on the stringers when said neck end is the leading end of the slider, one side of each groove acting as an abutment adjacent to and parallel to said groove, said abutments each being substantially coincident with the end of an inturned side flange, said groove and abutment arrangement being saw-toothed in cross-section, there being a slope from a leading flat portion of the wing to the base of the abutment, said grooves and abutments acting to convey extraneous material tending to enter the channel from the side in a direction outwardly relative to the channel and to block the entry of extraneous material tending to enter the channel from the neck end of the slider.

20. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing above the upper end of an inturned side flange, the end of said flange being squared, said groove diverging from the neck end in a direction opposite to the direction of fastener-closing movement of the slider on the stringers when said neck end is the leading end of the slider, one side of said groove acting as an abutment adjacent to and parallel to said groove, said abutment being substantially coincident with the end of the inturned side flange, said groove and abutment acting to convey extraneous material tending to enter the channel from the side in a direction outwardly relative to the channel and to block the entry of extraneous material tending to enter the channel from the neck end of the slider, and a diverging chamfer at the corner of each of the wings at the mouth end of the slider.

21. A slider for slide fasteners of the type having two stringers with a series of spaced, interlockable elements, said slider comprising a body having a front wing and a rear wing spacedly connected at one end by a neck portion, and further comprising a pair of inturned side flanges on each of said wings, said parts providing a substantially Y-shaped internal channel, a groove formed in each wing above the upper end of each inturned side flange, the end of each of said flanges being squared, said grooves diverging approximately 20 to 35 degrees from the neck end in a direction opposite to the direction of fastener-closing movement of the slider on the stringers when said neck end is the leading end of the slider, one side of each groove acting as an abutment adjacent to and parallel to said groove, said abutments each being substantially coincident with the end of an inturned side flange, said groove and abutment arrangement being saw-toothed in cross-section, there being a slope from a leading flat portion of the wing to the base of the abutment, said grooves and abutments acting to convey extraneous material tending to enter the channel from the side in a direction outwardly relative to the channel and to block the entry of extraneous material tending to enter the channel from the neck end of the slider, and a diverging chamfer at the corner of each of the wings at the mouth end of the slider.

22. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed in a direction which diverges outwardly relative to the longitudinal axis of the slider from the neck end toward the stem end of the slider and which is at an acute angle with respect to the direction of the upwardly diverging arm of the channel from which the groove guides extraneous material, said groove being too small in dimension to lock or permit the escape of the interlockable elements.

23. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a plurality of substantially parallel grooves formed in an inturned side flange to guide extraneous material outwardly from the channel, each of said grooves being disposed in a direction which diverges outwardly relative to the longitudinal axis of the slider from the neck end toward the stem end of the slider and which is at an acute angle with respect to the direction of the upwardly diverging arm of the channel from which the groove guides extraneous material, and said grooves being too small in dimension to lock or permit the escape of the interlockable elements.

24. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed at an acute angle relatively outwardly with respect to the direction of the upwardly diverging arm of the channel from which arm the groove guides extraneous material outwardly, and the upper inner end of said groove being nearer the upper end of the slider than the lower outer end of said groove, said lower outer end being substantially higher than the lower end of the slider.

25. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed at an acute angle relatively outwardly with respect to the direction of the upwardly diverging arm of the channel from which arm the groove guides extraneous material outwardly, and the upper inner end of said groove being nearer the upper end of the slider than the lower outer end of said groove, said lower outer end being substantially higher than the lower end of the slider, said groove being too small in dimension to lock or permit the escape of the interlockable elements.

26. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed in a direction which diverges outwardly relative to the longitudinal axis of the slider from a first end toward a second end of the slider, and which is at an acute angle with respect to the direction of the channel at said groove, and said groove being located nearer the first end than the junction of that part of a flange which defines the stem with that part of the same flange which defines an arm of the channel.

27. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed in a direction which diverges outwardly relative to the longitudinal axis of the slider from the neck end toward the stem end of the slider and which is at an acute angle with respect to the direction of the upwardly diverging arm of channel from which the groove guides extraneous material, and said groove being located nearer the neck end than the junction of that part of a flange which defines the stem with that part of the same flange which defines an arm of the channel.

*28. A slidable fastener member to connect and disconnect adjacent rows of stationary fastener elements, said member comprising a front and a back section connected by a neck at one end, each section having a laterally extending projection at each side adjacent said neck, and having flanges along both sides, the flanges of each section being presented to the other section and extending from the opposite end of the sections towards said projections and terminating short of the same, to guide said elements into engagement with one another, each projection of one section having a groove in its inner face, said grooves converging towards said neck.*

*29. A slidable fastener member to connect and disconnect adjacent rows of stationary fastener elements, said member comprising a front and a back section connected by a neck at one end, each section having a laterally exteding projection at each side adjacent said neck, and having flanges along both sides, the flanges of each section being presented to the other section and extending from the opposite end of the sections towards said projections and terminating short of the same, to guide said elements into engagement with one another, said projections each having a groove in its inner face, said grooves converging to said neck.*

*30. A slidable fastener member to connect and disconnect adjacent rows of stationary fastener elements, said member comprising a front and a back section connected by a neck at one end, each section having a laterally extending projection at each side adjacent said neck, and having flanges along both sides, the flanges of each section being presented to the other section and extending from the opposite end of the sections towards said projections and terminating short of the same, to guide said elements into engagement with one another, each projection of one section having a groove in its inner face, said grooves being disposed transversely of said projections and converging towards said neck, said grooves each having an end open at the side edges of said projections, adjacent said flanges and in proximity to adjacent ends of said flanges.*

*31. A slidable fastener member to connect and disconnect adjacent rows of stationary fastener elements, said member comprising a front and a back section connected by a neck at one end, each section having a laterally extending projection at each side adjacent said neck, and having flanges along both sides, the flanges of each section being presented to the other section and extending from the opposite end of the sections towards said projections and terminating short of the same, to guide said elements into engagement with one another, said projections each having a groove in its inner face, said grooves being disposed transversely of said projections and converging towards said neck, said grooves each having one end open at the side edges of said projections, adjacent said flanges and in proximity to adjacent ends of said flanges.*

References Cited in the file of this patent or the original patent

UNITED STATES PATENTS

| | | |
|---|---|---|
| 2,078,745 | Ulrich | Apr. 27, 1937 |
| 2,119,352 | Puc | May 31, 1938 |
| 2,174,002 | Hyde | Sept. 26, 1939 |
| 2,421,791 | Legat | June 10, 1947 |
| 2,568,163 | Morin | Sept. 18, 1951 |
| 2,596,861 | Meech | May 13, 1952 |